United States Patent
Kim et al.

(10) Patent No.: US 12,498,394 B2
(45) Date of Patent: Dec. 16, 2025

(54) CONNECTION JIG FOR TESTING SMALL CONNECTOR

(71) Applicant: SENSORVIEW CO., LTD., Gyeonggi-do (KR)

(72) Inventors: Byoung Nam Kim, Gyeonggi-do (KR); Kyoung Il Kang, Gyeonggi-do (KR); Sung Cheol Cho, Gyeonggi-do (KR); Jong Hyup Lim, Gyeonggi-do (KR); Dong Uk Lee, Gyeonggi-do (KR)

(73) Assignee: SENSORVIEW CO., LTD., Gyeonggi-do (KR)

( * ) Notice: Subject to any disclaimer, the term of this patent is extended or adjusted under 35 U.S.C. 154(b) by 164 days.

(21) Appl. No.: 18/578,401

(22) PCT Filed: Jun. 21, 2022

(86) PCT No.: PCT/KR2022/008742
§ 371 (c)(1),
(2) Date: Jan. 11, 2024

(87) PCT Pub. No.: WO2023/287046
PCT Pub. Date: Jan. 19, 2023

(65) Prior Publication Data
US 2025/0347715 A1    Nov. 13, 2025

(30) Foreign Application Priority Data
Jul. 16, 2021    (KR) ........................ 10-2021-0093648

(51) Int. Cl.
*G01R 1/04*    (2006.01)
*G01R 31/28*   (2006.01)

(52) U.S. Cl.
CPC ....... *G01R 1/0416* (2013.01); *G01R 31/2808* (2013.01)

(58) Field of Classification Search
CPC ... G01R 1/0408; G01R 31/2818; G01R 31/66
(Continued)

(56) References Cited

U.S. PATENT DOCUMENTS

| | | | |
|---|---|---|---|
| 2007/0057681 A1* | 3/2007 | Chang | G01R 1/0466 324/750.21 |
| 2015/0084658 A1 | 3/2015 | Lee | |
| 2015/0204906 A1* | 7/2015 | Ku | G01R 1/0466 324/756.05 |

FOREIGN PATENT DOCUMENTS

| | | |
|---|---|---|
| JP | H05299148 A | 11/1993 |
| JP | H06-27138 A | 2/1994 |

(Continued)

OTHER PUBLICATIONS

Office Action from corresponding JP Application No. 2024-502497 dated Feb. 4, 2025.

(Continued)

*Primary Examiner* — Roberto Velez
(74) *Attorney, Agent, or Firm* — Harness, Dickey & Pierce, P.L.C.

(57) ABSTRACT

A connection jig comprises: a first output terminal and a second output terminal for connecting to signal lines of the measuring instrument; a jig body having the shape of a plate-shaped block, into which the small connector can be inserted, and having an insertion hole penetrating from the upper surface to the lower surface of the plate-shaped block; a printed circuit board for a jig that can be inserted into the lower surface of the plate-shaped block and has a signal pattern that can be electrically connected to the small connector accommodated in the insertion hole; a lower cover detachably attached to the lower surface of the jig body and fixing the printed circuit board for the jig to the jig (Continued)

body; and an upper cover attachable to and detachable from the upper surface of the jig body and fixing the small connector to the jig body.

9 Claims, 8 Drawing Sheets

(58) Field of Classification Search
USPC .......................................................... 324/538
See application file for complete search history.

(56) References Cited

FOREIGN PATENT DOCUMENTS

| | | | |
|---|---|---|---|
| JP | 2004273192 | A | 9/2004 |
| JP | 2006-344524 | A | 12/2006 |
| JP | 2008-123795 | A | 5/2008 |
| JP | 2011-047885 | A | 3/2011 |
| JP | 2016153796 | A | 8/2016 |
| KR | 10-2004-0033341 | A | 4/2004 |
| KR | 10-0526754 | B1 | 11/2005 |
| KR | 10-0714569 | B1 | 5/2007 |
| KR | 10-2013-0054714 | A | 5/2013 |
| KR | 10-2014-0114683 | A | 9/2014 |
| KR | 10-1624981 | B1 | 5/2016 |
| KR | 10-2214056 | B1 | 2/2021 |

OTHER PUBLICATIONS

International Search Report from corresponding PCT Application No. PCT/KR2022/008742, dated Nov. 2, 2022.

* cited by examiner

CONNECTION JIG FOR TESTING SMALL CONNECTOR

CROSS-REFERENCE TO RELATED APPLICATIONS

This application is a national phase application of PCT Application No. PCT/KR2022/008742, filed on Jun. 21, 2022, which claims the benefit and priority to Korean Patent Application No. 10-2021-0093648, filed on Jul. 16, 2021. The entire disclosures of the applications identified in this paragraph are incorporated herein by references.

TECHNICAL FIELD

The present invention relates to a test jig for a small connector including an ultra-high frequency signal line, and more particularly, to a connection jig for testing a small connector, allowing a signal line of the small connector to be connected to a signal line of a printed circuit board to transmit an ultra-high frequency signal.

BACKGROUND ART

A next-generation 5G mobile communication system communicates through both low-frequency bands and high-frequency bands in the tens of gigahertz range, and electronic devices, such as smartphones, require low-loss radio frequency (RF) cables inside them for connecting low-frequency band radiators and modules, as well as for connecting high-frequency band radiators and modules in the tens of gigahertz range. Consequently, there is a need for a separate device enabling electrical measurements on RF cables with excellent shielding properties that are not influenced by the surrounding environment, minimize signal loss during transmission, and do not affect other radiators for different purposes.

In a traditional PCB connector, a male connector, in which a terminal of an electrical signal line, such as a cable, a wire, or the like, for transmitting an electrical signal is covered by a male connector housing, is inserted into and connected to a female connector (or a socket) mounted on a printed circuit board (PCB). In this case, a receiving member that accommodates a terminal or a pin of the male connector is installed in a female connector housing of the female connector, and through this receiving member, leakage current occurs, leading to signal loss and limitations in miniaturizing the connector.

To address these issues, a small connector for ultra-high-frequency signal transmission has been developed by enhancing shielding performance to reduce leakage current, minimize signal loss, and significantly lowering the height of the connector, achieving miniaturization.

Testing is required for the electrical characteristics of the small connector for ultra-high frequency signal transmission. However, it is challenging to physically connect the small connector for ultra-high-frequency signal transmission directly to a measurement instrument for measuring electrical characteristics due to its small size. Therefore, a separate test jig that electromagnetically shields ultra-high-frequency signals and isolates each signal line individually is necessary to establish a direct connection between the small connector for ultra-high-frequency signal transmission and the measurement instrument.

DETAILED DESCRIPTION OF THE INVENTION

Technical Problem

An object of the present invention is to provide a connection jig for testing a small connector for ultra-high frequency signal transmission as a jig for testing electrical characteristics of the above-described small connector for ultra-high-frequency signal transmission, the connection jig capable of providing a low-loss transmission line and shielding electrical radiation of a signal pattern of a printed circuit board.

Technical Solution

A connection jig for testing a small connector for testing electrical characteristics of a small connector transmitting an ultra-high frequency signal by using a measuring instrument, according to the present invention for achieving the above object, includes: a first output terminal and a second output terminal for connecting to signal lines of the measuring instrument; a jig body having the shape of a plate-shaped block, into which the small connector can be inserted, and having an insertion hole penetrating from the upper surface to the lower surface of the plate-shaped block; a printed circuit board for a jig that can be inserted into the lower surface of the plate-shaped block and has a signal pattern that can be electrically connected to the small connector accommodated in the insertion hole; a lower cover detachably attached to the lower surface of the jig body and fixing the printed circuit board for the jig to the jig body; and an upper cover attachable to and detachable from the upper surface of the jig body and fixing the small connector to the jig body.

The jig body may have a board seating groove formed on the lower surface, allowing for insertion of the printed circuit board for a jig.

The printed circuit board for a jig may be one of a rectangular panel, a circular panel, or a polygonal panel, a first terminal pattern and a second terminal pattern that are in contact with signal terminals of the small connector to transmit an ultra-high frequency signal may be formed at a central portion of an upper surface of the rectangular, circular, or polygonal panel, and a first transmission line pattern forming a transmission line between the first terminal pattern and the first output terminal and a second transmission line pattern forming a transmission line between the second terminal pattern and the second output terminal may be formed on a lower surface of the rectangular, circular, or polygonal panel.

When the small connector is composed of a male connector and a female connector, the first terminal pattern and the second terminal pattern may each be joined to the female connector through soldering.

The first transmission line pattern and the second transmission line pattern may be symmetrically formed, along a length direction, at the central portion of the rectangular, circular, or polygonal panel.

The connection jig may further include a first dielectric pattern and a second dielectric pattern to electrically insulate the first transmission line pattern from a ground of the printed circuit board for a jig and electrically insulate the second transmission line pattern from the ground of the printed circuit board for a jig.

A plurality of first via holes for signal isolation may be formed at points where the first transmission line pattern and the second transmission line pattern are adjacent to each other.

The printed circuit board for a jig may have a plurality of second via holes for noise shielding formed on edge portions on both sides of the rectangular, circular, or polygonal panel.

The first via holes and the second via holes may each have a hole surface coated with a metallic material to electrically connect one side and the other side of the rectangular, circular, or polygonal panel.

The lower cover may include a first space portion and a second space portion, each forming a predetermined space at positions facing the first transmission line pattern and the second transmission line pattern, respectively.

The upper cover may be provided with a plurality of magnet members on its edge portions for attachment and detachment from the jig body, and at a specific point of the edge portion, there may be a protrusion portion that protrudes further than the corresponding edge portion of the jig body.

Advantageous Effects

According to the connection jig for testing a small connector for ultra-high-frequency signal transmission in accordance with the present invention, it is possible to easily test the electrical characteristics (return loss, insertion loss, isolation, crosstalk, electromagnetic (EM) radiation pattern, etc.) of a small connector for ultra-high-frequency signal transmission. Furthermore, according to the present invention, it is possible to provide a low-loss transmission line, while shielding the electrical radiation from signal lines formed on a printed circuit board mounted on a test jig and also allowing individual isolation of each signal line.

MODE FOR INVENTION

Figure 1:
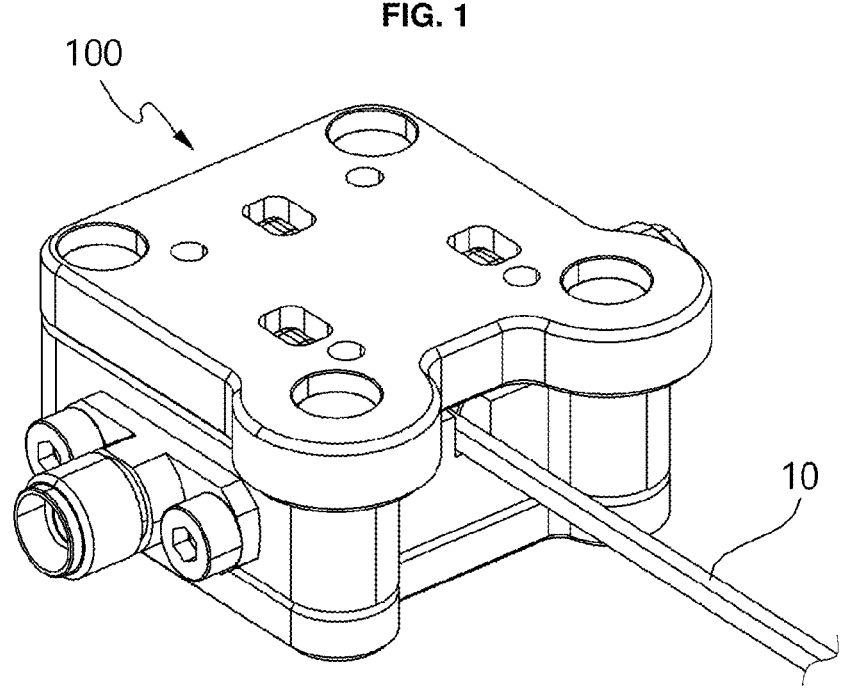
FIG. 1 is a perspective view showing a state in which a connection jig for testing a small connector according to an embodiment of the present invention is connected to a small connector.

Hereinafter, exemplary embodiments of the present invention will be described in detail with reference to the attached drawings. Since the embodiments disclosed in the specification and components shown in the drawings are merely exemplary embodiments of the present invention and do not represent an entirety of the technical concept of the present invention, it should be understood that a variety of equivalents and modifications capable of substituting the embodiments and the components may be present at the time of filing of the present application.

FIG. 1 is a perspective view showing a state in which a connection jig 100 (hereinafter, referred to as a "connection jig") for testing a small connector according to an embodiment of the present invention is connected to a small connector 10.

The small connector 10 is a printed circuit board (PCB) connector that connects a single or multiple ultra-high frequency signal lines configured to transmit ultra-high frequency signals and a PCB.

The small connector 10 may be detachably attached to the connection jig 100 in order to transmit ultra-high frequency signals transmitted and received through a transmission cable to the connection jig 100.

The small connector 10 may be composed of a male connector and a connector socket. The male connector is connected to a single or multiple ultra-high frequency signal lines, accommodates terminals of the single or multiple ultra-high frequency signal lines, and is provided with a male connector housing that fixes and protects the terminals of the ultra-high frequency signal lines. The connector socket accommodates the male connector housing and is coupled to the male connector. The connector socket may be in contact with the PCB for a jig that constitutes the connection jig 100. In this case, the ultra-high frequency signal line terminals of the male connector may be in direct contact with and connected to signal line terminals formed on the PCB for a jig.

The connection jig 100 connects the small connector 10 and a measurement instrument (not shown) for testing the electrical characteristics (return loss, insertion loss, isolation, crosstalk, electromagnetic (EM) radiation pattern, etc.) of the small connector 10 that transmits ultra-high frequency signals.

Figure 2:
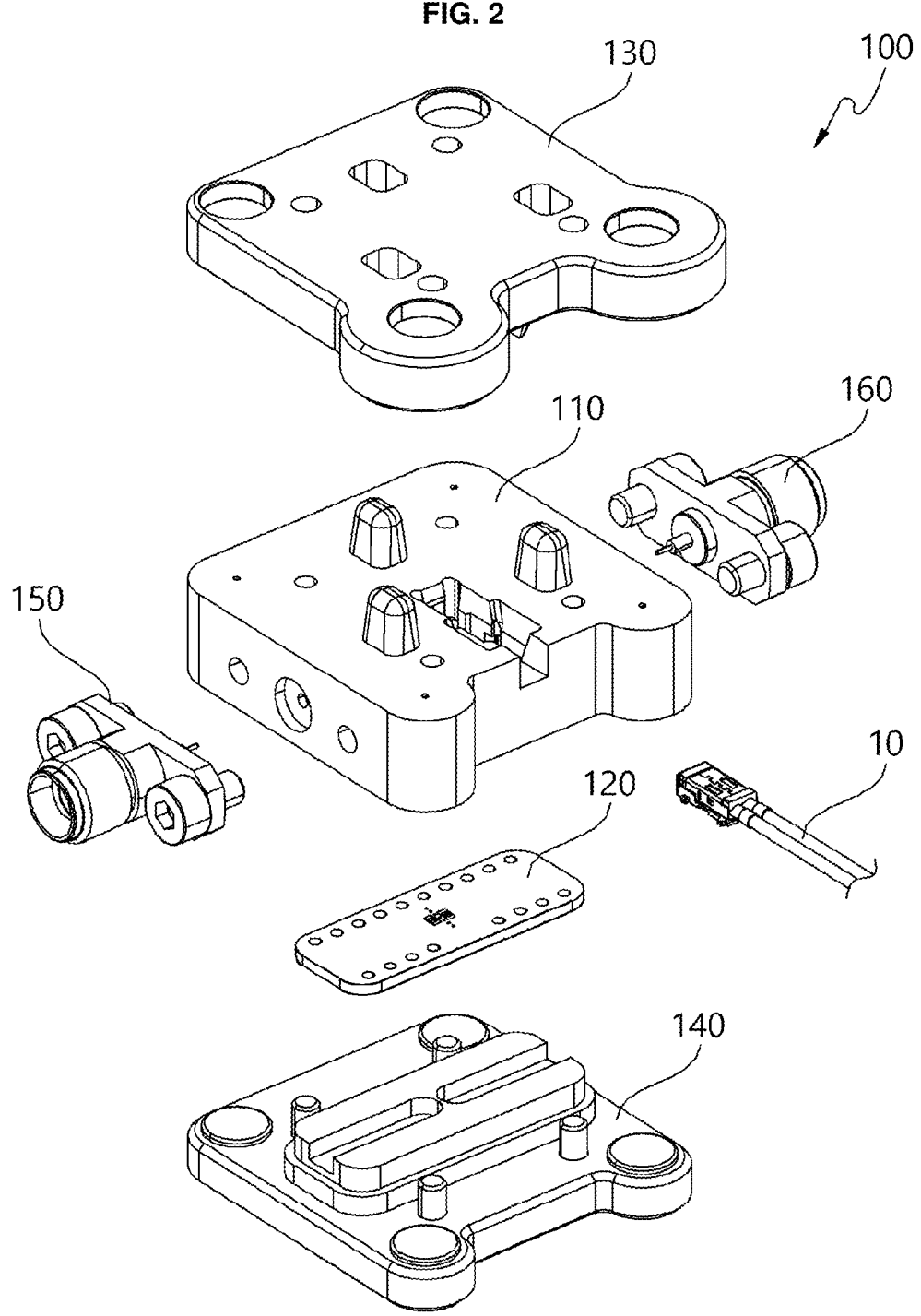
FIG. 2 is an exploded perspective view of the connection jig shown in FIG. 1.

FIG. 2 is an exploded perspective view of the connection jig shown in FIG. 1.

Referring to FIG. 2, the connection jig 100 includes a jig body 110, a PCB 120 for a jig, an upper cover 130, a lower cover 140, a first output terminal 150, and a second output terminal 160.

The jig body 110 has the shape of a plate-shaped block, featuring a structure where the small connector 10 can be seated. The jig body 110 may be made of a metallic material.

Figure 3A:
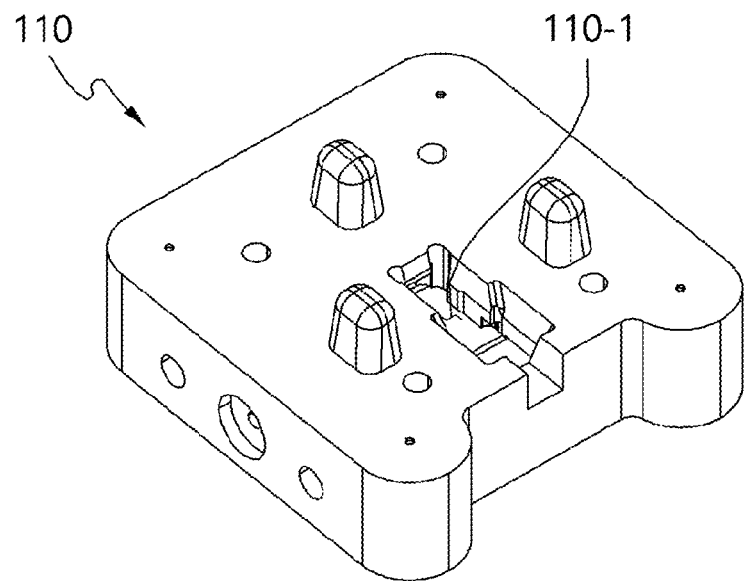
FIG. 3A is a top perspective view of a jig body shown in FIG. 2.
Figure 3B:
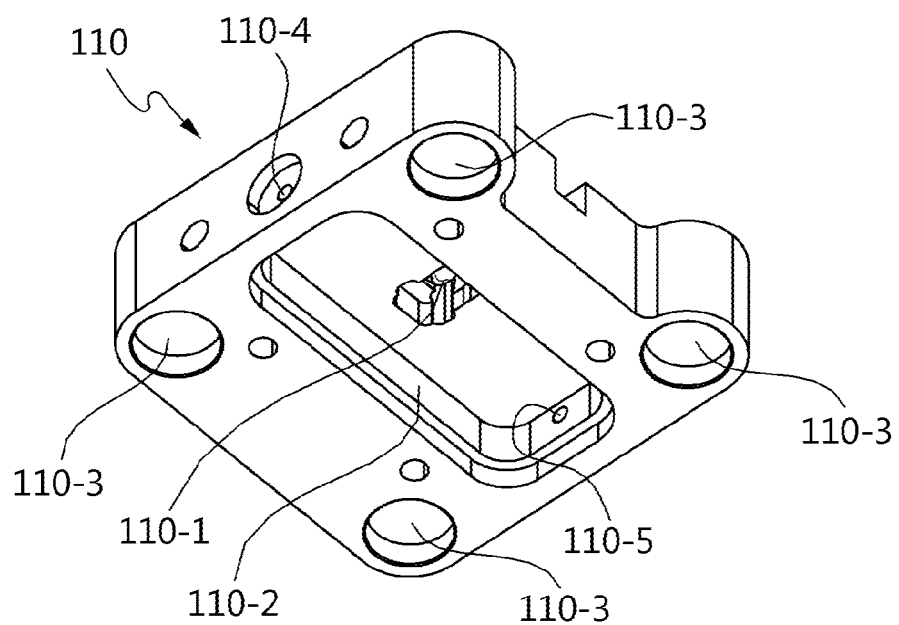
FIG. 3B is a bottom perspective view of the jig body shown in FIG. 2.

FIG. 3A is a top perspective view of the jig body 110 shown in FIG. 2, and FIG. 3B is a bottom perspective view of the jig body 110 shown in FIG. 2.

The jig body 110 includes an insertion hole 110-1. The insertion hole 110-1 allows for the insertion of the small connector 10 and penetrates through the plate-shaped block from the upper surface to the lower surface. The insertion hole 110-1 may be given a gradient on an upper boundary surface, facilitating easy insertion of the small connector.

As shown in FIG. 3b, on the lower surface of the jig body 110, a board seating groove 110-2 is formed to allow the insertion of the PCB 120 for a jig. To allow the PCB 120 for a jig to be inserted and seated, the board seating groove 110-2 forms a groove on the lower surface of the jig body 110 corresponding to the outline of the PCB 120 for a jig to a predetermined depth.

The jig body 110 includes a plurality of body magnet members 110-3 in grooves on the edge portions of the plate-shaped block. The polarity of the body magnet members 110-3 may be either N-pole or S-pole, opposite to the polarity of magnet members provided in the upper cover as described below.

FIG. 3B illustrates cylindrical body magnet members 110-3 placed at four points in the edge portions of the plate-shaped block. However, this is merely illustrative, and the number and placement of magnet members may be adjusted.

The jig body 110 may have a first output hole 110-4 into which the first output terminal 150 can be inserted and a second output hole 110-5 into which the second output terminal 160 can be inserted on the side portions of the plate-shaped block.

Each of the first output hole 110-4 and the second output hole 110-5 penetrates the side of the board seating groove 110-2. Consequently, when the PCB 120 for a jig is seated in the board seating groove 110-2, the first output terminal 150 can be inserted into the first output hole 110-4 to make contact with one side of the lower surface of the PCB 120 for a jig, and the second output terminal 160 can be inserted into the second output hole 110-5 to make contact with the opposite side of the lower surface of the PCB 120 for a jig.

The PCB 120 for a jig may be inserted into the board seating groove 110-2 formed on the lower surface of the jig body 110, and a signal pattern than can be electrically connected to the small connector inserted into the insertion hole 110-1 of the jig body 110 is formed on the PCB 120 for a jig.

Figure 4A:
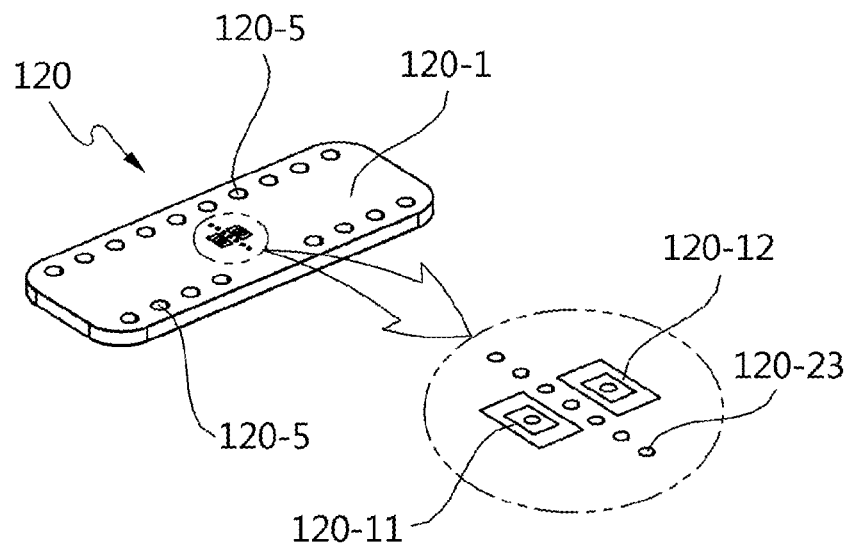
FIG. 4A is a top perspective view of a printed circuit board for a jig shown in FIG. 2.
Figure 4B:
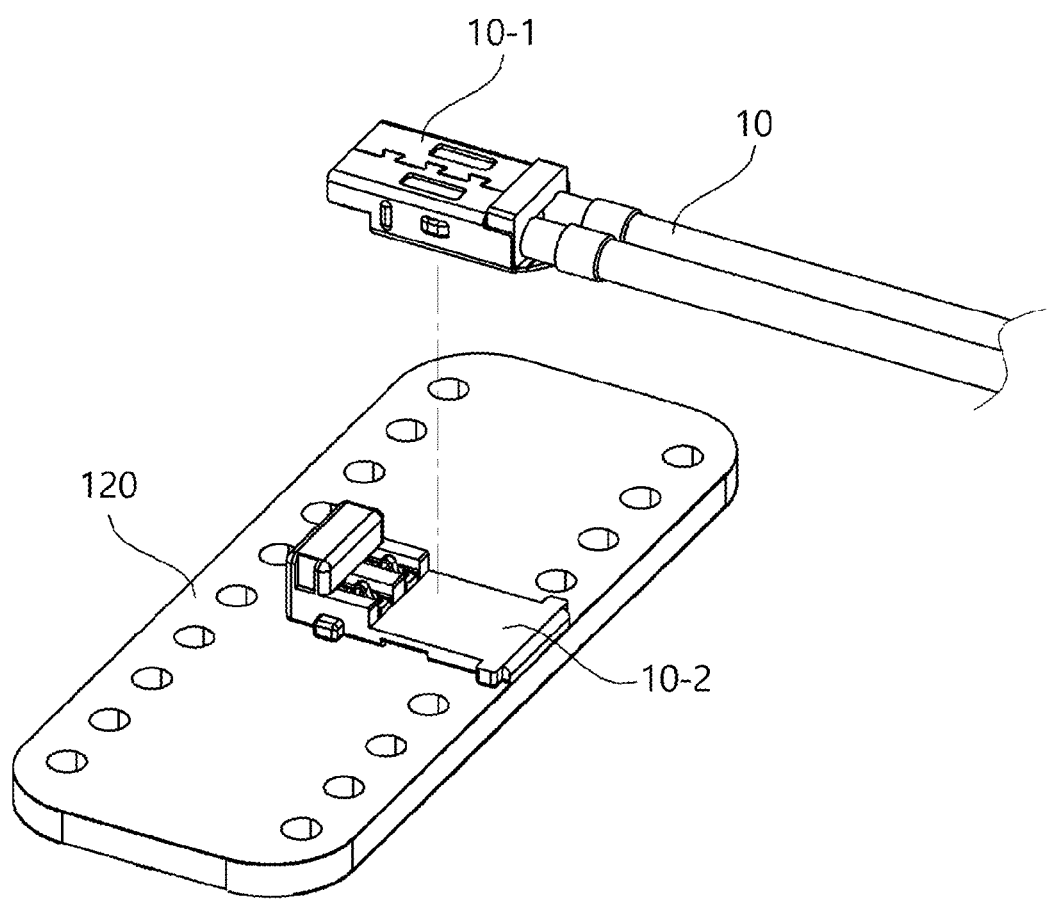
FIG. 4B is a perspective view showing a state in which a female connector of a small connector is coupled to an upper part of the printed circuit board for a jig.
Figure 4C:
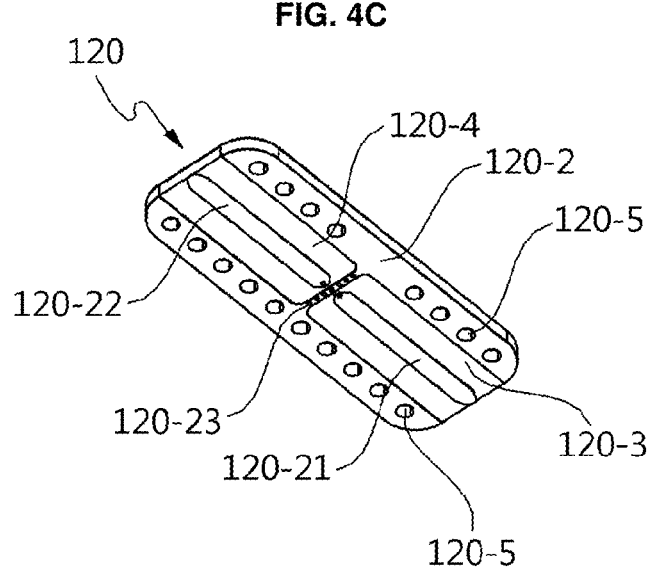
FIG. 4C is a bottom perspective view of the printed circuit board for a jig shown in FIG. 2.

FIG. 4A is a top perspective view of the PCB 120 for a jig shown in FIG. 2, FIG. 4B is a perspective view showing a state in which a female connector of the small connector 10 is coupled to an upper part of the PCB 120 for a jig, and FIG. 4C is a bottom perspective view of the PCB 120 for a jig shown in FIG. 2.

The PCB 120 for a jig connects the small connector 10 to the first output terminal 150 and the second output terminal 160.

In FIGS. 4A to 4C, the PCB 120 for a jig is illustrated as having a rectangular panel structure, but the panel structure of the PCB 120 for a jig is not limited to this and may include a circular panel, a polygonal panel, or the like.

In the PCB 120 for a jig, a first terminal pattern 120-11 and a second terminal pattern 120-12 that make direct contact with signal terminals of the small connector 10 to transmit ultra-high frequency signals are formed at the central portion of an upper surface 120-1 of the rectangular, circular, or polygonal panel.

In order to make contact with two signal terminals of the small connector 10 inserted into the insertion hole 110-1 of the jig body 110, the first terminal pattern 120-11 and the second terminal pattern 120-1 may be symmetrically arranged with respect to first via holes 120-23 at the central portion of the PCB 120 for a jig, corresponding to the positions of the two signal terminals. The first terminal pattern 120-11 extends a signal pattern through the PCB 120 for a jig to be electrically connected to a first transmission line pattern 120-21, which will be described below, and the second terminal pattern 120-12 similarly extends a signal pattern through the PCB 120 for a jig to be electrically connected to a second transmission line pattern 120-22, which will be described below.

As shown in FIG. 4B, in the case where the small connector 10 is composed of a male connector 10-1 and a female connector 10-2, the first terminal pattern 120-11 and the second terminal pattern 120-12 may each be joined to the female connector 10-2 through soldering. Specifically, the first terminal pattern 120-11 may be connected to one side terminal of the female connector 10-2 through soldering, and the second terminal pattern 120-12 may be connected to the opposite side terminal of the female connector 10-2 through soldering. In this case, the male connector 10-1 and the female connector 10-2 of the small connector 10 may be formed with a structure allowing them to be mutually attached and detached.

The PCB 120 for a jig includes the first transmission line pattern 120-21 forming a transmission line between the first terminal pattern 120-11 and the first output terminal 150 and a second transmission line pattern 120-22 forming a transmission line between the second terminal pattern 120-12 and the second output terminal 160 on the lower surface 120-2 of the rectangular, circular, or polygonal panel. The first transmission line pattern 120-21 and the second transmission line pattern 120-22 may be symmetrically formed in a stripe shape, along the length direction, at the central portion of the rectangular, circular, or polygonal panel.

One side of the stripe in the first transmission line pattern 120-21 may be connected to the first terminal pattern 120-11, and the opposite side of the stripe may make contact with the first output terminal 150. In addition, one side of the stripe in the second transmission line pattern 120-22 may be connected to the first terminal pattern 120-11, and the opposite side of the stripe may make contact with the second output terminal 160.

When testing the electrical characteristics (return loss, insertion loss, isolation, crosstalk, EM radiation pattern, etc.) of the small connector 10 for ultra-high-frequency signal transmission, it is challenging to directly connect the small connector 10 to a measurement instrument due to its small size. Therefore, the PCB 120 for a jig is provided to secure a physical space in which the small connector 10 is directly connected to the measurement instrument, and the first output terminal 150 and the second output terminal 160 are included, allowing a signal terminal of the measurement instrument to be connected to the PCB 120 for a jig.

In addition, since one side of the first transmission line pattern 120-21 is adjacent to one side of the second transmission line pattern 120-22, the PCB 120 for a jig has a plurality of first via holes 120-23 for signal isolation formed between the first transmission line pattern 120-21 and the second transmission line pattern 120-22. The PCB 120 for a jig may include the plurality of first via holes 120-23 to prevent electrical crosstalk and interference between signal lines. The plurality of first via holes 120-23 block impedance mismatches and leakage current (leakage radiation) in the transmission lines (signal patterns), provide substrate integrated waveguide (SIW) functionality for noise shielding, and also play a role in electrically connecting the upper plating layer and the lower plating layer. Each of the first via holes 120-23 has a hole surface coated with a metallic material. Consequently, the upper surface 120-1 and the lower surface 120-2 of the rectangular, circular, or polygonal panel may be electrically connected and grounded through the first via holes 120-23. The diameter of each first via hole 120-23 may be relatively small compared to the distance between the first transmission line pattern 120-21 and the second transmission line pattern 120-22.

In addition, a chamfer (not shown) may be formed on the lower surface 120-2 of the PCB 120 for a jig to achieve impedance matching between the transmission line and the first output terminal 150 or the second output terminal 160.

The lower surface 120-2 of the PCB 120 for a jig includes a first dielectric pattern 120-3 and a second dielectric pattern 120-4 to electrically insulate the first and second transmission line patterns 120-21 and 120-22 for signal transmission from the ground.

As shown in FIG. 4B, the first dielectric pattern 120-3 is formed in a manner that surrounds the first transmission line pattern 120-21, and the second dielectric pattern 120-4 is formed in a manner that surrounds the second transmission line pattern 120-22.

In addition, the PCB 120 for a jig has a plurality of second via holes 120-5 for noise shielding symmetrically formed at edge portions on both sides of the rectangular, circular, or polygonal panel. Each of the second via holes 120-5 has a hole surface coated with a metallic material. Consequently, the upper surface 120-2 and the lower surface 120-5 of the rectangular, circular, or polygonal panel may be electrically connected and grounded through the second via holes 120-5. The diameter of each second via hole 120-5 may be considerably larger compared to the aforementioned first via holes 120-23.

The material of the PCB 120 for a jig may be one of paper phenolic, epoxy, polyimide, thermosetting polyimide resin, Teflon, ceramic, or composite insulation material. Additionally, the signal patterns serving as transmission lines on the PCB 120 for a jig may be formed in the form of microstrip, stripline, coplanar waveguide (CPW), coplanar waveguide with ground (CPWG), or the like.

The upper cover 130 is attachable to and detachable from the upper surface of the jig body 110, fixing the small connector 10 to the jig body 110. The upper cover 130 electromagnetically shields the signal pattern, which is the transmission line formed on the PCB 120 for a jig by coupling with the jig body 110.

This upper cover 130 may be made of a metallic material or transparent polycarbonate material.

Figure 5A:
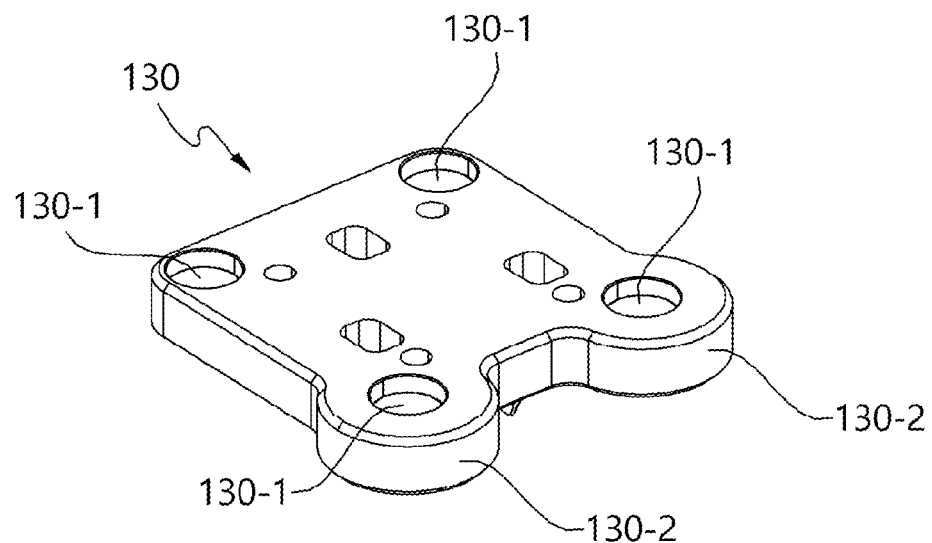
FIG. 5A is a top perspective view of an upper cover shown in FIG. 2.
Figure 5B:
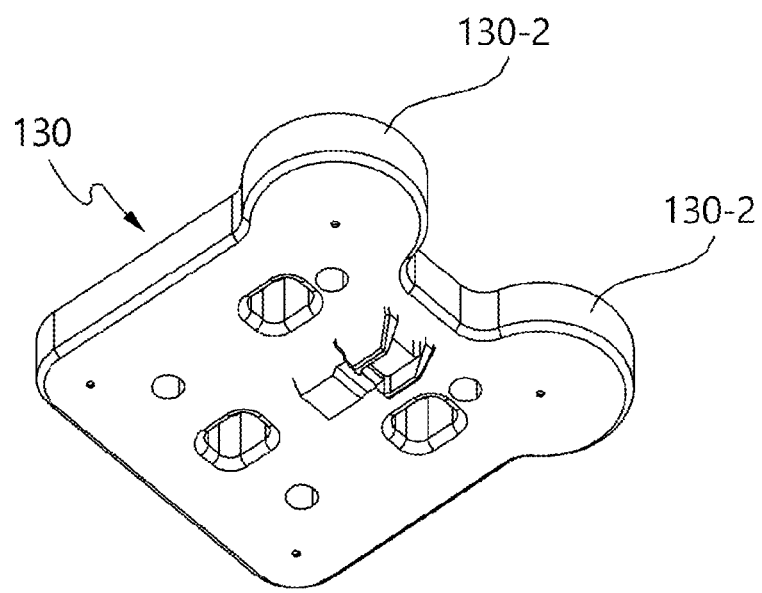
FIG. 5B is a bottom perspective view of the upper cover shown in FIG. 2.

FIG. 5A is a top perspective view of the upper cover 130 shown in FIG. 2, and FIG. 5B is a bottom perspective view of the upper cover 130 shown in FIG. 2.

Referring to FIGS. 5A and 5B, the upper cover 130 is provided with a plurality of cover magnet members 130-1 on the respective grooves of the edge portions for attachment and detachment from the jig body 110. The polarity of the cover magnet members 130-1 may be either N-pole or S-pole, opposite to the polarity of the body magnet members 110-3 of the jig body 110. Furthermore, the placement of the cover magnet members 130-1 may correspond to the positions where the body magnet members 110-3 are located.

Due to the magnetic interaction between the cover magnet members 130-1 and the body magnet members 110-3, the upper cover 130 may easily couple to the upper surface of the jig body 110 and is also easily detachable. FIG. 5B illustrates cylindrical body magnet members 130-1 placed at four points in the edge portions of the plate-shaped cover. However, this is merely illustrative, and the number and placement of cover magnet members may be adjusted.

At some points of the edge portions of the upper cover 130 where the cover magnetic members 130-1 are placed, there may be protrusion portions 130-2 that protrude further than the corresponding edge of the jig body 110. The protrusion portion 130-2 may have a cylindrical structure, allowing easy attachment and detachment of the upper cover 130 from the jig body 110.

The lower cover 140 is attachable to and detachable from the lower surface of the jig body 110, fixing the PCB 120 for a jig into the board seating groove 110-2 of the jig body 110. The lower cover 140 electromagnetically shields the signal pattern formed on the PCB 120 for a jig by coupling with the jig body 110. This lower cover 140 may be made of a metallic material.

Figure 6A:
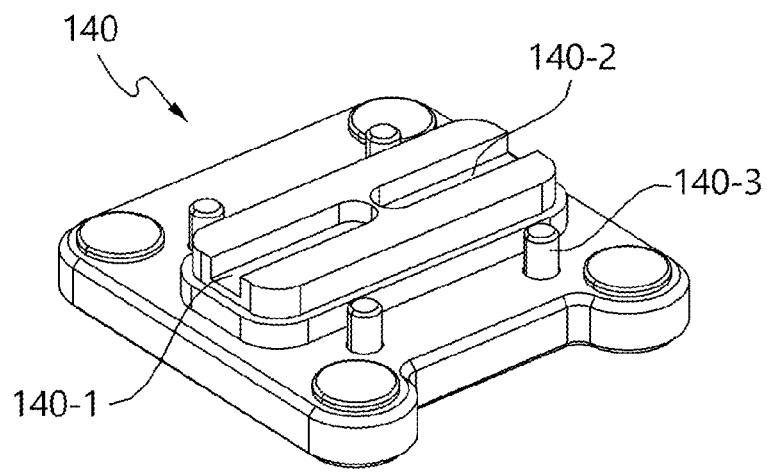
FIG. 6A is a top perspective view of a lower cover shown in FIG. 2.
Figure 6B:
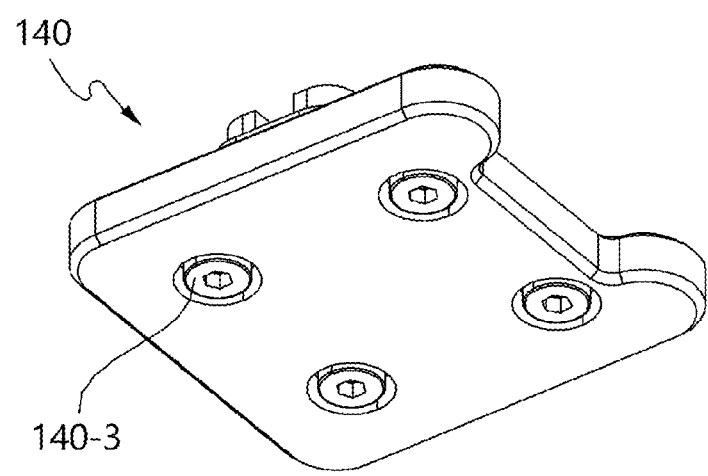
FIG. 6B is a bottom perspective view of the lower cover shown in FIG. 2.

FIG. 6A is a top perspective view of the lower cover 140 shown in FIG. 2, and FIG. 6B is a bottom perspective view of the lower cover 140 shown in FIG. 2.

The lower cover 140 includes a first space portion 140-1 and a second space portion 140-2, each forming a predetermined space at positions facing the first transmission line pattern 120-21 and the second transmission line pattern 120-22, respectively. The first space portion 140-1 forms an air space with a shape similar to the stripe of the first transmission line pattern 120-21 at a position facing the first transmission line pattern 120-21. Also, the second space portion 140-2 forms an air space with a shape similar to the stripe of the second transmission line pattern 120-22 at a position facing the second transmission line pattern 120-22.

The first space portion 140-1 functions as an air barrier to block interference between the signal flowing through the first transmission line pattern 120-21 and the signal flowing through the second transmission line pattern 120-22. Similarly, the second space portion 140-2 functions as an air barrier to block interference between the signal flowing through the second transmission line pattern 120-22 and the signal flowing through the first transmission line pattern 120-21.

To couple with the lower surface of the jig body 110, the lower cover 140 may include a plurality of coupling members 140-3. The coupling members 140-3 may have a bolt structure and may be fastened to the nut structure formed on the jig body 110 by a screw insertion method.

The first output terminal 150 and the second output terminal 160 are signal terminals for connection to the signal lines of the measurement instrument. The first output terminal 150 and the second output terminal 160 are connected to transmitting and receiving signal terminals (not shown) of the measurement instrument.

Figure 7:
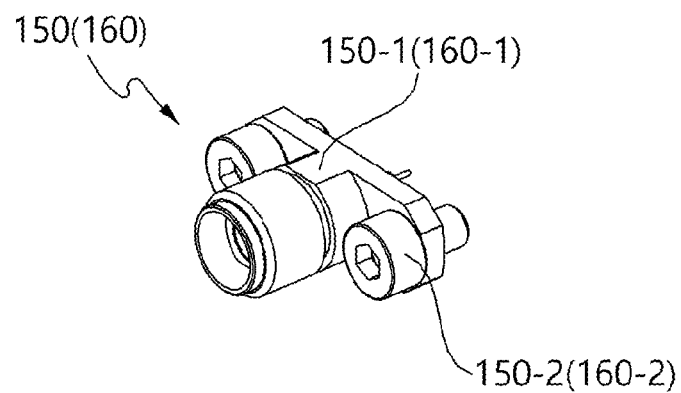
FIG. 7 is an enlarged reference view of a first output terminal or a second output terminal shown in FIG. 2.

FIG. 7 is an enlarged reference view of the first output terminal or the second output terminal shown in FIG. 2.

Referring to FIG. 7, the first output terminal 150 or the second output terminal 160 includes a terminal portion 150-1 or 160-1 and coupling members 150-2 or 160-2 for making contacting with the PCB 120 for a jig.

One end of the terminal portion 150-1 or 160-1 is connected to the PCB 120 for a jig, and the opposite end is connected to the transmitting and receiving signal terminal (not shown) of the measurement instrument. Additionally, the coupling members 150-2 or 160-2 allow the terminal portion 150-1 or 160-1 to be coupled to the jig body 110. The coupling members 140-3 may have a bolt structure and may be fastened to the nut structure formed on the jig body 110 by a screw insertion method.

Figure 8:
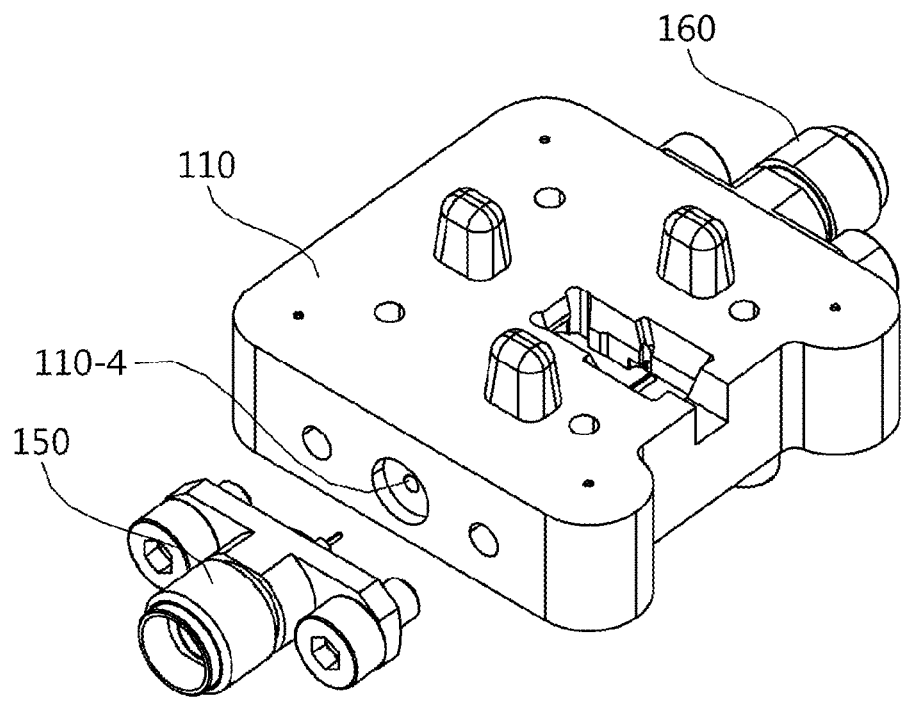
FIG. 8 is a reference view illustrating the coupling relationship of the first output terminal coupled to a jig body.

FIG. 8 is a reference view illustrating the coupling relationship of the first output terminal 150 coupled to the jig body 110. Referring to FIG. 8, in order to couple to the first output terminal 150, the first output hole 110-4 of the jig body 110 has a shape on the contacting surface with the first output terminal 150 to ensure impedance matching of the signal lines.

A number of exemplary embodiments have been particularly shown and described with reference to certain exemplary embodiments thereof. It will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

INDUSTRIAL APPLICABILITY

The present invention can be efficiently applied in the field of manufacturing connectors used for ultra-high frequency communications.

What is claimed is:

1. A connection jig for testing a small connector for testing the electrical characteristics of a small connector transmitting an ultra-high frequency signal by using a measuring instrument, the connection jig comprising:
   a first output terminal and a second output terminal for connecting to signal lines of the measuring instrument;
   a jig body having the shape of a plate-shaped block, into which the small connector can be inserted, and having an insertion hole penetrating from the upper surface to the lower surface of the plate-shaped block;
   a printed circuit board for a jig that can be inserted into the lower surface of the plate-shaped block and has a signal pattern that can be electrically connected to the small connector accommodated in the insertion hole;
   a lower cover detachably attached to the lower surface of the jig body and fixing the printed circuit board for the jig to the jig body; and
   an upper cover attachable to and detachable from the upper surface of the jig body and fixing the small connector to the jig body,
   wherein the jig body has a board seating groove formed on the lower surface, allowing for insertion of the printed circuit board for a jig.

2. A connection jig for testing a small connector for testing the electrical characteristics of a small connector transmitting an ultra-high frequency signal by using a measuring instrument, the connection jig comprising:
   a first output terminal and a second output terminal for connecting to signal lines of the measuring instrument;
   a jig body having the shape of a plate-shaped block, into which the small connector can be inserted, and having an insertion hole penetrating from the upper surface to the lower surface of the plate-shaped block;
   a printed circuit board for a jig that can be inserted into the lower surface of the plate-shaped block and has a signal pattern that can be electrically connected to the small connector accommodated in the insertion hole;
   a lower cover detachably attached to the lower surface of the jig body and fixing the printed circuit board for the jig to the jig body; and
   an upper cover attachable to and detachable from the upper surface of the jig body and fixing the small connector to the jig body,
   wherein the printed circuit board for a jig is one of a rectangular panel, a circular panel, or a polygonal panel,
   wherein a first terminal pattern and a second terminal pattern that are in contact with signal terminals of the small connector to transmit an ultra-high frequency signal are formed at a central portion of an upper surface of the rectangular, circular, or polygonal panel, and
   wherein a first transmission line pattern forming a transmission line between the first terminal pattern and the first output terminal and a second transmission line pattern forming a transmission line between the second terminal pattern and the second output terminal are formed on a lower surface of the rectangular, circular, or polygonal panel.

3. The connection jig of claim 2, wherein, when the small connector is composed of a male connector and a female connector, the first terminal pattern and the second terminal pattern are each joined to the female connector through soldering.

4. The connection jig of claim 2, wherein the first transmission line pattern and the second transmission line pattern are symmetrically formed, along a length direction, at a central portion of the rectangular, circular, or polygonal panel.

5. The connection jig of claim 4, further comprising a first dielectric pattern and a second dielectric pattern to electrically insulate the first transmission line pattern from a ground of the printed circuit board for a jig and electrically insulate the second transmission line pattern from the ground of the printed circuit board for a jig.

6. The connection jig of claim 4, wherein a plurality of first via holes for signal isolation are formed at points where the first transmission line pattern and the second transmission line pattern are adjacent to each other.

7. The connection jig of claim 6, wherein the first via holes and the second via holes each have a hole surface coated with a metallic material to electrically connect one side and the other side of the rectangular, circular, or polygonal panel.

8. The connection jig of claim 2, wherein the printed circuit board for a jig has a plurality of second via holes for noise shielding formed on edge portions on both sides of the rectangular, circular, or polygonal panel.

9. The connection jig of claim 2, wherein the lower cover includes a first space portion and a second space portion, each forming a predetermined space at positions facing the first transmission line pattern and the second transmission line pattern, respectively.

* * * * *